United States Patent [19]
Brede et al.

[11] 3,742,438
[45] June 26, 1973

[54] ECHO SOUNDING APPARATUS WITH AUTOMATICALLY REGULATED RECEIVER GAIN

[75] Inventors: Raymond Brede, Borre; Erik Stenresen, Horten, both of Norway

[73] Assignee: Simrad A.S., Horten, Norway

[22] Filed: Nov. 9, 1971

[21] Appl. No.: 196,919

[52] U.S. Cl. .............................................. 340/3 R
[51] Int. Cl. ........................................... G01s 9/70
[58] Field of Search ...................... 340/3 R, 3 F, 2; 343/7 A

[56] References Cited
UNITED STATES PATENTS
3,325,778   6/1967   Ballard ................................ 340/2 X
3,440,598   4/1969   Drenkelfort et al. ................ 340/3 R

*Primary Examiner*—Richard A. Farley
*Attorney*—Watson, Cole, Grindle & Watson

[57] ABSTRACT

The present invention discloses an echo sounding apparatus with two receiver channels, each having individually variable receiver gain regulated in accordance with a suitable predetermined time function during each sounding period. The gain regulations of the channels are operatively adapted to compensate for the scattering and dissipation losses of the sounding signals, in order to obtain appropriate relative indications of fish echo signals and bottom echo signals, respectively; a common indication organ being switched from the channel regulated with respect to fish echoes, to the other channel upon the reception of a bottom echo signal, and back to the former channel again upon the transmission of the next sounding pulse.

4 Claims, 1 Drawing Figure

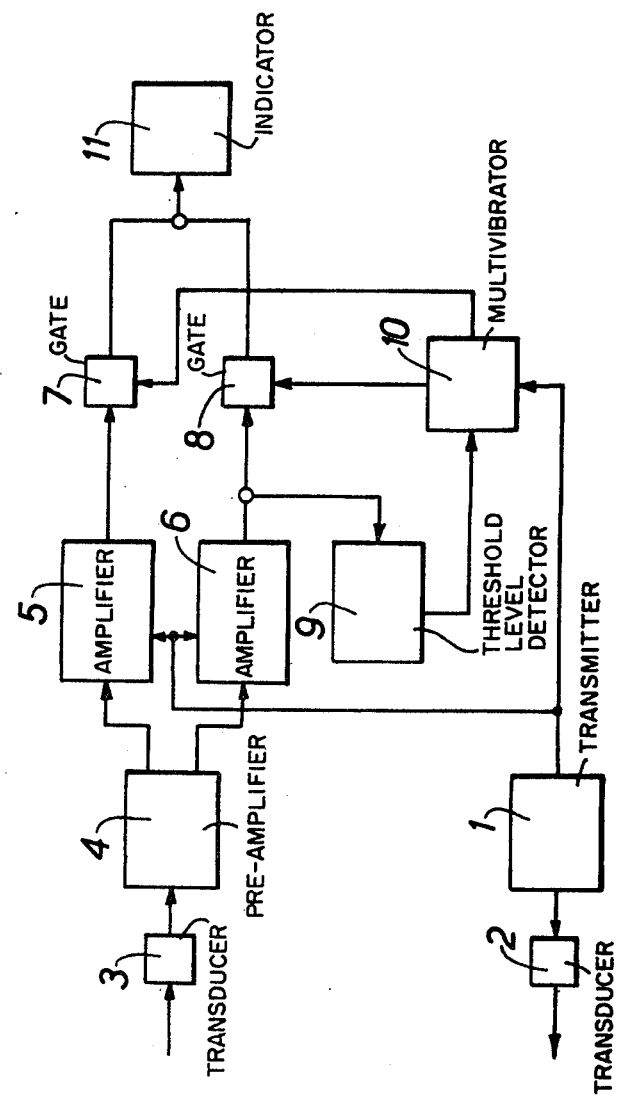

ECHO SOUNDING APPARATUS WITH AUTOMATICALLY REGULATED RECEIVER GAIN

The present invention relates to an echo sounding apparatus with variable receiver gain automatically regulated in accordance with predetermined time functions during each sounding period, in order to achieve optimum indications of both fish and sea bottom. By these means easy operation and maximum information at any time are obtained.

By echo sounding for fish it is known that the gain of the echo receiver involved must be adjusted in dependence of the depth range which is to be investigated, so that the gain is successively increased with increasing indicated depth during each sounding period, in order to compensate for the total scattering and attenuation of the echo sounding signals during their propagation through the water. This may be done manually, but is at present usually done automatically by means of a corresponding regulation voltage, triggered by the retransmitted echo sounding pulse and operatively adapted to control the receiver gain in such a manner during the sounding period that the achieved echo signal indications are effectively compensated for the transmission losses in the water, these losses increasing with increasing depth. Such an arrangement is advantageous for the operator, as it will not be necessary to adjust the receiver gain in the course of the sounding process to obtain appropriate indications.

The above arrangement, however, will not, for the same pre-adjusted regulation voltage function, ascertain appropriate compensation of both fish echo signals and echo signals from the sea bottom, as the respective compensations needed with respect to fish indications and bottom indications are quite different. Regarding fish echo signals it has been found suitable in practice to utilize a compensation function of the form, $(40 \log r + 2\alpha r)$, whereas a function of the form $(20 \log r + 2\alpha r)$ has been found more suitable for the bottom echo signals. In both the above expressions $\log r$ designates the Briggs logarithm of the sounded depth in meters and $\alpha$ the attenuation constant of the propagation of the sounding signals through water. Thus, if the above compensation function, $(40 \log r + 2\alpha r)$ suitable for fish echoes also is applied for the bottom echo signals, the bottom will be too weakly indicated at small depths and too strongly emphasized at larger depths. This will make an adequate evaluation of the bottom conditions more difficult and give rise to problems with the application of known "white line," "grey line" and similar bottom contour functions, as these functions generally are based on an evaluation of the bottom echo signal amplitude. Thus, when utilizing compensation adapted for fish echoes, the operator will meet serious problems regarding the bottom signal activated functions, and often be compelled to frequently readjust the triggering level of the functions during the sounding operations. Conversely, when the function $(20 \log r + 2\alpha r)$ is applied, the fish echo signals from large depths will be too weakly indicated, whereas similar signals from smaller depths will be too strongly emphasized.

Thus, generally the object of the present invention is to provide an echo sounding apparatus which makes an appropriate compensation of both the fish echo and bottom echo signals possible.

According to the invention this is achieved by means of an echo sounding apparatus which comprises a first and a second receiver channel, each provided with an associated amplifier operatively adapted to perform gain regulation in accordance with a particular pre-set function. Switching means are connected both with an echo sounding transmitter included in the apparatus and with a threshold level detector, which in turn is connected with the amplifier in the second channel. The switching means being operative to connect a common indicator, alternatively with the amplifier in the first channel, when receiving from the transmitter a control signal derived from a transmitted sounding pulse, or with the amplifier in the second channel upon reception of a control signal produced by the threshold level detector, when the same is actuated, through the second channel, by an echo signal, e.g., a bottom echo signal, with a strength or rising rate exceeding a pre-set threshold value.

Thus, this apparatus according to the invention allows, upon the reception of a bottom echo signal, a switching of a common indicator from a separate receiver channel for fish echo signals to another separate receiver channel for the bottom echo signals and a subsequent switching back to the first-mentioned channel, when the next sounding pulse is transmitted.

Such utilization of individual receiver channels for fish echoes and bottom echoes respectively, makes mutually independent gain regulations in the two channels possible, so that different compensation functions, each suitable to the existing purpose, may be applied in the respective channels.

The invention will now be explained in more detail with reference to the accompanying drawing, showing a block diagram of an exemplified embodiment of the echo sounding apparatus according to the invention.

In the drawing there is shown a conventional echo sounding transmitter 1, which controls an electro-acoustic tranducer 2, mounted to transfer sound pulses to the surrounding water. Another (or alternatively the same) electro-acoustic transducer 3 receives echo signals reflected from objects in the water and from the sea bottom. These signals are amplified in a pre-amplifier 4, the output signals of which are supplied in parallel to an amplifier 5 regulated in accordance with the above function $(40 \log r + 2\alpha r)$ and another amplifier 6 regulated according to the above function $(20 \log r + 2\alpha r)$. These regulation processes are triggered, as indicated in the block diagram, from the transmitter 1 when a sounding pulse is transmitted. The outputs of the regulated amplifiers 5 and 6 are respectively connected with the gates 7 and 8, the outputs of which are jointly connected with an indicator 11. The output signals from the regulated amplifier 6 are also supplied to a threshold level detector 9, which, when a bottom echo is received, submit a control pulse to a bistable multivibrator 10. This multivibrator also receives a control pulse from the echo sounding transmitter 1, this pulse being derived from the transmitter puls which is transferred to the electroacoustic transducer. When bistable multivibrator 10 receives a pulse from the transmitter 1, it is set in a state which effects opening of the gate 7 and closing of the gate 8, so that the output signals from the pre-amplifier 4 may pass the regulated amplifier 5 and the gate 7 in order to reach the indicator 11, which e.g. may be a conventional recorder with an associated recorder amplifier. Thus, in this operative state of the apparatus an optimum indication of the fish echo signals may be obtained.

When a bottom echo signal is received, this will normally be transferred from the regulated amplifier 6 to the detector 9 with an amplitude exceeding the pre-adjusted threshold value of the detector. The detector 9 then produces a pulse which is transferred to the bistable multivibrator 10, which thus is actuated to change its state and thereby effect a closing of the gate 7 and simultaneously an opening of the gate 8. This will allow a transfer of the bottom echo signal through the regulated amplifier 6 and the gate 8 to the indicator 11.

The indicator will receive all echo signals through the last mentioned channel until the next sounding pulse is transmitted and consequently a new control pulse is transferred from the transmitter 1 to the bistable multivibrator 10. This causes a further change of state for the multivibrator to effect a re-opening of the gate 7 and a corresponding simultaneous closing of the gate 8.

Each of the regulated amplifiers 5 and 6 is, in addition to the above automatic regulation means, provided with ordinary gain adjustment means, in order to allow mutually independent manual gain adjustments of the two amplifiers.

We claim:

1. Echo sounding apparatus with variable receiver gain automatically regulated in accordance with a pre-determined time function during each sounding period, comprising a first and a second receiver channel, each said channel including an associated amplifier for regulating gain in accordance with a particular preset function; switching means connected both with an echo sounding transmitter and with a threshold level detector connected with the amplifier in one of said channels; said switching means being operative to connect a common indicator alternatively with said amplifier in said first channel when receiving from said transmitter a control signal derived from a transmitted sounding pulse, or with the amplifier in said second channel upon reception of a control signal produced by the threshold level detector when actuated through said second channel by an echo signal with a strength or rising rate exceeding a pre-set threshold value.

2. Echo sounding apparatus as claimed in claim 1, wherein said switching means comprise two controlled gates each having an input connected with an individually associated one of said amplifier, the outputs of said gates being jointly connected with said indicator; a bistable multivibrator having two outputs, each output is connected with the control input of an individually associated one of said gates, and two outputs respectively connected with said threshold level detector and said transmitter; said multivibrator being operative to assume a first state, which effects opening of that said gate which is connected with said amplifier in said first channel and closing of the other said gate when said control pulse from said transmitter is received; and a second state which effects the opposite condition of said gates when said control pulse from said threshold level detector is received.

3. Echo sounding apparatus as claimed in claim 1, wherein the amplifier gain of said first receiver channel is pre-set to vary in accordance with the predetermined function ($40 \log r + 2\alpha r$) in order to achieve optimum compensation of the attenuation of received echo signals from fish, whereas the amplifier gain of said second receiver channel is pre-set to vary in accordance with the predetermined function ($20 \log r + 2\alpha r$) in order to achieve optimal compensation of the attenuation of received echo signals from the sea bottom, $\log r$ being the Briggs logarithm of the sounded depth in meters and $\alpha$ being the attenuation constant for the propagation of said signals through water.

4. Echo sounding apparatus as claimed in claim 1, wherein each of the amplifiers in said two channels includes means for independent gain adjustments in order to achieve optimum signal indication of signals from both said channels.

* * * * *

UNITED STATES PATENT OFFICE
CERTIFICATE OF CORRECTION

Patent No. 3,742,438  Dated June 26, 1973

Inventor(s) Raymond Brede and Erik Stenersen

It is certified that error appears in the above-identified patent and that said Letters Patent are hereby corrected as shown below:

[30]  Foreign Application Priority Date

November 10, 1970    Norway    No. 4283/70

[75]  Inventors: Raymond Brede, Borre; Erik Stenersen, Horten, both of Norway

Signed and sealed this 18th day of December 1973.

(SEAL)
Attest:

EDWARD M. FLETCHER, JR.          RENE D. TEGTMEYER
Attesting Officer                Acting Commissioner of Patents